United States Patent [19]
Itoh

[11] Patent Number: 5,362,537
[45] Date of Patent: Nov. 8, 1994

[54] OPTICAL INFORMATION RECORDING MEDIUM COMPRISING TWO MAGNETO-OPTICAL LAYERS WHICH ARE MADE OF GDFECO AND TBFETI, RESPECTIVELY

[75] Inventor: Masaki Itoh, Tokyo, Japan
[73] Assignee: NEC Corporation, Tokyo, Japan
[21] Appl. No.: 39,795
[22] Filed: Mar. 30, 1993

[30] Foreign Application Priority Data
Mar. 30, 1992 [JP] Japan ................... 4-071879

[51] Int. Cl.$^5$ ................... B32B 3/00
[52] U.S. Cl. ................... 428/64; 428/65; 428/457; 428/694 MM; 428/694 RL; 428/694 DE; 428/694 SC; 428/913; 369/288
[58] Field of Search ........... 428/64, 65, 457, 913, 428/694 MM, 694 RL, 694, 694 DE, 694 SC; 430/945; 369/288

[56] References Cited

U.S. PATENT DOCUMENTS

| | | | |
|---|---|---|---|
| 5,075,145 | 12/1991 | Yamamoto et al. | 428/64 |
| 5,093,174 | 3/1992 | Suzuki et al. | 428/64 |
| 5,292,592 | 3/1994 | Itoh | 428/626 |

FOREIGN PATENT DOCUMENTS

0258978 3/1988 European Pat. Off. .
60-48806 10/1985 Japan .

OTHER PUBLICATIONS

Goro Fujita et al., "A Magneto-Optical Recording Method of Magnetic . . . Pulsed Laser Irradiation", Japanese Journal of Applied Physics, vol. 28 (1989) Supplement 28-3, pp. 329-333.
Sakuya Tamada et al., "Design Concept of Magneto-Optical Disk", Japanese Journal of Applied Physics, vol. 28 (1989) Supplement 28-3, pp. 67-70.

*Primary Examiner*—Patrick J. Ryan
*Assistant Examiner*—Elizabeth Evans
*Attorney, Agent, or Firm*—Sughrue, Mion, Zinn, Macpeak & Seas

[57] ABSTRACT

For use in recording information by an irradiation of a laser beam, an optical information recording medium comprises a substrate transparent for the laser beam and a first and a second magneto-optical layer which are made of GdFeTi and TbFeCo, respectively. The first magneto-optical layer is between the substrate and the second magneto-optical layer and thermally coupled to the second magneto-optical layer. For carrying out a recording operation, the laser beam is irradiated to the substrate to heat the first magneto-optical layer. A temperature of the first magneto-optical layer is transferred to the second magneto-optical layer. In this condition, the second magneto-optical layer is subjected to a magnetic field representative of information. As a result, the information is recorded as recorded information to the second magneto-optical layer. The recorded information is transferred from the second magneto-optical layer to the first magneto-optical layer with decreasing of the temperature of the first magneto-optical layer. The recorded information can be read from the first magneto-optical layer in the manner known in the art.

10 Claims, 3 Drawing Sheets

OPTICAL INFORMATION RECORDING MEDIUM COMPRISING TWO MAGNETO-OPTICAL LAYERS WHICH ARE MADE OF GDFECO AND TBFETI, RESPECTIVELY

BACKGROUND OF THE INVENTION

This invention relates to an optical information recording medium, such as a magneto-optical disk, which is used for recording information by an irradiation of a laser beam.

Various optical information recording media of the type are already known. For example, an optical information recording medium is disclosed by Sakuya Tamada and five others in Japanese Journal of Applied Physics, Vol. 28 (1989), Supplement 28-3, pp. 67–70, under the title of "Design Concept of Magneto-Optical Disk". Another optical information recording medium is disclosed by Goro Fujita and three others in Japanese Journal of Applied Physics, Vol. 28 (1989), Supplement 28-3, pp. 329–333, under the title of "A Magneto-Optical Recording Method of Magnetic Field Modulation with Pulsed Laser Irradiation".

In the manner which will later be described more in detail, a conventional optical information recording medium comprises a substrate and a single magneto-optical layer coupled to the substrate for recording the information. The substrate is made of polycarbonate and therefore is transparent for the laser beam. The magneto-optical layer is made of ferri-magnetic amorphous alloy which is composed of iron series transition metals and rare-earth transition metal.

For carrying out a recording operation of the information, various methods are already known. A particular one of the methods is disclosed in Japanese Patent Publication No. 60-48806 by Mimura et al. In the particular method, the laser beam is irradiated to the substrate with the magneto-optical layer subjected to a particular magnetic field representative of the information. In this event, the particular magnetic field has a polarity which is controlled to indicate the information. The laser beam is focused on the magneto-optical layer through the substrate. As a result, the information is recorded as recorded information in a particular portion of the magneto-optical layer in the manner known in the art. The particular method will be called hereunder a magnetic field modulation method.

With the magnetic field modulation method, it is possible to record different information in the particular portion of the magneto-optical layer without carrying out a deleting operation which is for deleting the recorded information from the particular portion. However, it is advantageous that a recording and reading characteristic is insufficient for practical use.

SUMMARY OF THE INVENTION

It is therefore an object of this invention to provide an optical information recording medium which is suitable for use in combination with the above-mentioned magnetic field modulation method.

It is another object of this invention to provide an optical information recording medium of the type described, which is excellent in a recording and reading characteristic in a case where information is recorded by the magnetic field modulation method.

It is still another object of this invention to provide a method which is suitable for carrying out an access operation to an optical information recording medium of the type described.

Other objects of this invention will become clear as the description proceeds.

According to an aspect of this invention, there is provided an optical information recording medium being used for recording information by an irradiation of a laser beam with a magnetic field. The recording medium comprises a substrate transparent for the laser beam, a first magneto-optical layer of GdFeCo, and a second magneto-optical layer of TbFeTi, the first magneto-optical layer being between the substrate and the second magneto-optical layer.

According to another aspect of this invention, there is provided a method of carrying out a recording operation to an optical information recording medium by the use of a laser beam, the recording medium comprising a substrate transparent for the laser beam, a first magneto-optical layer of GdFeCo, and a second magneto-optical layer of TbFeTi, the first magneto-optical layer being between the substrate and the second magneto-optical layer. The method comprises the steps of irradiating the laser beam as a recording beam onto the first magneto-optical layer through the substrate to heat the first magneto-optical layer, transferring a temperature of the first magneto-optical layer to the second magneto-optical layer, subjecting the second magneto-optical layer to a magnetic field representative of information to make the second magneto-optical layer be recorded with the information as recorded information with the recording beam irradiated onto the substrate, and transferring the recorded information from the second magneto-optical layer to the first magneto-optical layer.

According to still another aspect of this invention, there is provided a method of carrying out a reading operation to an optical information recording medium by the use of a reading beam. The recording medium has a first magneto-optical layer and a second magneto-optical layer which is recorded with information by the use of a recording beam. The information is transferred from the second magneto-optical layer to the first magneto-optical layer. The reading beam has a recording power. The method comprises the step of irradiating the reading beam to the recording medium so that the reading beam is focused on the first magneto-optical layer. The reading beam has a power which is less than the recording power. The method further comprises the step of making a relative movement between the recording medium and the reading beam.

DESCRIPTION OF THE PREFERRED EMBODIMENTS

Figure 1:
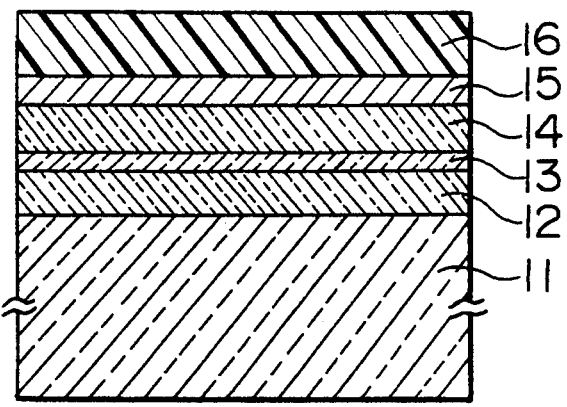
FIG. 1 is a vertical sectional view of a conventional optical recording medium.

Referring to FIG. 1, a conventional optical information recording medium will first be described for a better understanding of this invention. The conventional recording medium is generally called a magneto-optical disk and is used for recording information by an irradiation of a laser beam.

The recording medium comprises a substrate 11, an interference layer 12 on the substrate 11, a magneto-optical layer 13 on the interference layer 12, a dielectric layer 14 on the magneto-optical layer 13, a metal layer 15 on the dielectric layer 14, and a protective layer 16 on the metal layer 15. The substrate 11 is made of polycarbonate and therefore is transparent for the laser beam. The interference layer 12 is made of silicon nitride and is transparent for the laser beam. The magneto-optical layer 13 is made of ferri-magnetic amorphous alloy which is composed of iron series transition metals and rare-earth transition metal. The magneto-optical layer 13 is semitransparent for the laser beam. The dielectric layer 14 is made of dielectric material which is transparent for the laser beam. The metal layer 15 is made of an Al-Ti alloy and therefore is opaque for the laser beam.

For carrying out a recording operation of the information, the laser beam is irradiated as a recording beam onto the magneto-optical layer 13 through the substrate 11 and the interference layer 12 with the magneto-optical layer 13 subjected to a magnetic field which will later become clear. The recording beam is focused to have a beam diameter of about 1.4 microns on the magneto-optical layer 13.

In this event, the recording beam is emitted from a laser source (not shown) to have a recording power in the manner known in the art. As the laser source, use is made of a semiconductor laser having a wavelength of about 830 nm. The recording beam is controlled to represent the information. The magnetic field has magnetic field strength and a polarity which are constant. Responsive to the recording beam, the information is recorded as recorded information on the magneto-optical layer 13 in the manner known in the art.

The recording beam has a part which is incident to the dielectric layer 14 through the magneto-optical layer 13. Each of the interference and the dielectric layers 12 and 14 produces a multiple interference effect in the manner known in the art. As a result, the recording operation is reliably carried out even when the recording power is relatively small.

For carrying out a reading operation of the recorded information, the laser beam is irradiated as a reading beam to focus on the magneto-optical layer 13 through the substrate 11 and the interference layer 12. In this event, the reading beam has a reading power which is less than the recording power.

The reading beam is reflected as a reflected beam from the magneto-optical layer 13. The reflected beam is incident to a photo detector (not shown) through the interference layer 12, the substrate 11, and an analyzer (not shown) which is well known in the art. As a result, the recorded information is read in the manner known in the art.

It will be assumed that the conventional recording medium is recorded with the information by the magnetic field modulation method described in the background part. However, it is advantageous that a recording and reading characteristic is insufficient for practical use.

Figure 2:
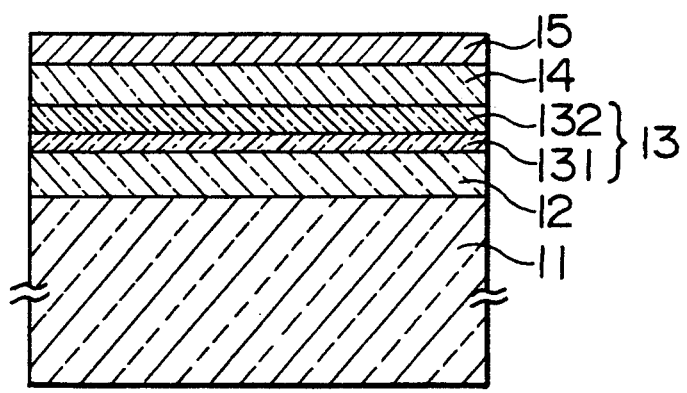
FIG. 2 is a vertical sectional view of an optical recording medium according to a first embodiment of this invention.

Referring to FIG. 2, the description will be directed to an optical information recording medium according to a first embodiment of this invention. The recording medium comprises similar parts designated by like reference numerals.

In the recording medium, the magneto-optical layer 13 comprises a first magneto-optical layer 131 on the interference layer 12, and a second magneto-optical layer 132 between the first magneto-optical layer 131 and the dielectric layer 14. The first magneto-optical layer 131 is made of ferri-magnetic amorphous alloy of GdFeCo and has a first Curie-point. The second magneto-optical layer 132 is made of ferri-magnetic amorphous alloy of TbFeTi and has a second Curie-point which is lower than the first Curie-point. It is a matter of course that each of the first and the second magneto-optical layers 131 and 132 is capable of vertically magnetising and is semitransparent for the laser beam.

The substrate 11 is made of polycarbonate. The substrate 11 may be composed of a selected one of a glass plate and an acrylic resin plate each of which is coated with photopolymer. The recording medium has a large number of tracks which are arranged to have a track pitch between 0.8 and 1.6 microns. The information is recorded along each of the tracks. It is preferable that the substrate 11 has guiding grooves or pits which are used for carrying out a predetermined tracking servo in the manner known in the art.

Each of the interference and the dielectric layers 12 and 14 is made of a selected one of silicon nitride and silicon hydride and carbide. The metal layer 15 is made of a selected one of an Al alloy and an Au alloy. It is preferable that the metal layer 15 is composed of a material selected from a group consisting of AlTi, AlCr, AlNiCr, AlTa, and AuCu.

For carrying out each of a recording operation and a reading operation of the information, the laser beam is irradiated as each of the recording beam and the reading beam onto the first magneto-optical layer 131 through the substrate 11 and the interference layer 12. The laser beam is focused to have a beam diameter of about 1.3 microns in the vicinity of the first magneto-optical layer 131. This results in increasing of temperature of the first magneto-optical layer 131. Inasmuch as the second magneto-optical layer 132 is on the first magneto-optical layer 131, a thermal coupling is obtained between the first and the second magneto-optical layers 131 and 132. Therefore, the second magneto-optical layer 132 has a temperature which is increased in response to increasing of the temperature of the first magneto-optical layer 131. As the laser source, use is made of a semiconductor laser having a wavelength between 670 and 830 nm.

The first and the second magneto-optical layers 131 and 132 have a first and a second particular portion, respectively, which are heated on carrying out the recording operation. When the laser beam is irradiated as the recording beam for carrying out the recording operation, the first particular portion is heated to make the second particular portion have a recording temperature which is slightly lower than the second Curie point. At the recording temperature, the first and the second portions do not substantially make an exchange coupling to each other in the manner known in the art. In this condition, the second particular portion is subjected to a particular magnetic field which will later be described in detail. As a result, the information is recorded as the recorded information to the second particular portion in the manner known in the art.

In practical use, the recording medium is moved relative to the laser beam and the magnetic field on carrying out the recording operation. After being recorded with the information, the first and the second particular portions are not heated and are gradually cooled down. This is because the recording beam is not irradiated onto the first particular portion. When the first and the second particular portions are cooled to have a reading temperature which is lower than the recording temperature, they make the exchange coupling to each other in the manner known in the art. Therefore, the recorded information is magnetically copied from the second particular portion to the first particular portion.

The information is represented by a binary form. The particular magnetic field has a polarity corresponding to the binary form. More particularly, the polarity is changed in response to a lapse of time to represent the information that is represented by the binary form. The recording beam is continuously irradiated onto the recording medium with the recording power being constant. When the recording medium is moved relative to the laser beam and the magnetic field generating unit, the information is recorded on the recording medium.

The recording beam may intermittently be irradiated onto the recording medium. The recording power may be decreased from a relatively large value to a relatively small value while the information is recorded to the first and the second particular portions. These result in making a recording density be relatively high.

When irradiated with the laser beam as the reading beam for carrying out the reading operation, the first particular portion has the reading temperature that is lower than the recording temperature. This is because the reading power is less than the recording power. The reading beam is reflected as the reflected beam from the particular portion. The reflected beam is incident to the photo detector through the interference layer 12, the substrate 11, and the analyzer. As a result, the recorded information is read in the manner known in the art. It is to be noted that, at the reading temperature, the first magneto-optical layer 131 has a coercive force which is higher than that of the second magneto-optical layer 132.

Figure 3:
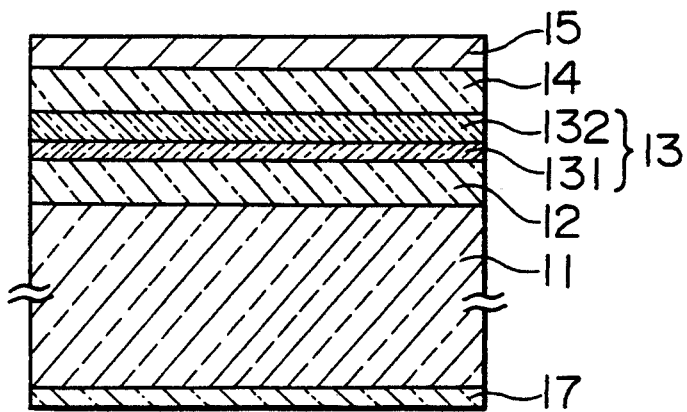
FIG. 3 is a vertical sectional view of a modification of the optical recording medium illustrated in FIG. 2.

Turning to FIG. 3, the description will be directed to a modification of the optical information recording medium illustrated in FIG. 2. The modification comprises similar parts designated by like reference numerals.

On describing the modification with reference to FIG. 3, it may be mentioned here that the substrate 11 has first and second principal surfaces. The layers 12, 131, 132, 14, and 15 are formed successively on the first principal surface.

The modification further comprises a covering layer 17 on the second principal surface of the substrate 11. The covering layer 17 is made of $SiO_2$ and is for protecting the transmission of the moisture into the substrate 11.

The modification is more advantageous in its weather resistance than the recording medium that is illustrated with reference to FIG. 2. More particularly, a deflection does not occur in the recording medium even when the recording medium is used or preserved in a hot and humid environment for a long time. This is because the covering layer 17 protects the transmission of the moisture into the substrate 11 in addition to the protective layer 16 protecting the transmission of the moisture into the alloy layer 15.

Figure 4:
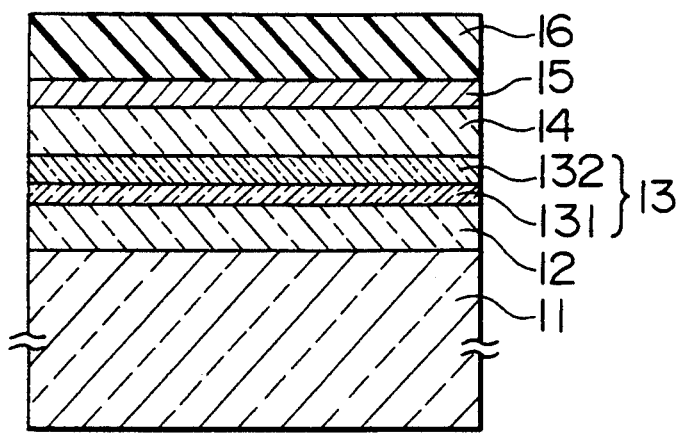
FIG. 4 is a vertical sectional view of an optical recording medium according to a second embodiment of this invention.

Turning to FIG. 4, the description will be directed to an optical information recording medium according to a second embodiment of this invention. The recording medium comprises similar parts designated by like reference numerals. In the recording medium, the protective layer 16 is made of an organic material, such as ultraviolet curable resin.

The description will now proceed to a method of manufacturing the recording medium of FIG. 4 by the use of a sputtering device (not shown).

At first, a circular plate is placed in the sputtering device. The circular plate is made of polycarbonate to have a diameter of 86 mm and a thickness of 1.20 mm. After the sputtering device is evacuated into vacuum below $5 \times 10^{-7}$ Torr, the circular plate is subjected to sputter etching to have a surface part removed to an approximate depth of 2 nm. This results in manufacturing the substrate 11.

A silicon target is subjected to sputtering in a gas mixture of argon and nitrogen to deposit, on the substrate 11, the interference layer 12 to a thickness of 80 nm. A GdFeCo target (Gd:Fe:Co=20.5:65.0:14.5 at %) is subjected to sputtering in an argon gas to deposit, on the interference layer 12, the first magneto-optical layer 131 to a thickness of 16 nm. A TbFeTi target (Tb:Fe:Ti=18.6:79.4:2.0 at %) is subjected to sputtering in the argon gas to deposit, on the first magneto-optical layer 131, a second magneto-optical layer 132 to a thickness of 69 nm. A silicon target is subjected to sputtering in the gas mixture to deposit, on the second magneto-optical layer 132, the dielectric layer 14 to a thickness of 160 nm. An Al-Ti alloy target (containing 1.0% by weight of Ti) is subjected to sputtering in the argon gas to deposit, on the dielectric layer 14, the metal layer 15 to a thickness of 105 nm. In this manner, the optical information recording medium of FIG. 4 is partly manufactured to a half-completed medium.

After the metal layer 15 is formed, the half-completed medium is brought out from the sputtering device into an atmospheric air. The metal layer 15 is subjected to spin-coating with ultraviolet curable resin in the manner known in the art. As a result, the metal layer 15 is covered by the ultraviolet curable resin. To the ultraviolet curable resin covering the metal layer 15, ultraviolet rays are irradiated to form the protective layer 16 having an ultimate thickness of 10 microns.

The description will proceed to a test of characteristics of the recording medium of FIG. 4.

The recording medium is rotated at 3600 rpm. In this condition, the recording medium is subjected to the particular magnetic field with a laser beam of a laser diode irradiated onto the first magneto-optical layer 131 through the substrate 11 and the interference layer 12 and focused to have a reduced diameter which is substantially equal to 1.3 microns. Herein, the laser beam has a wavelength of 670 nm. For a signal having a recording frequency of 1.0 MHz, writing operation is carried out at a radial distance of 30 mm with a duty ratio of 50%, a recording bias magnetic field of ±250 oersted, and a recording power of 4 mW. Under the circumstances, the C/N ratio is equal to 45 dB. It is thus confirmed that the recording medium has an excellent recording sensitivity and an excellent signal quality.

After the recording medium had been preserved in an environment of a temperature of 80° C. and a relative humidity of 90% for 500 hours, it was observed that problems do not occur in the recording and reading operation. Therefore, the recording medium is sufficient for practical use.

The description will be directed to a modification of the method mentioned above. The recording medium is manufactured so that the interference layer 12 is made of silicon hydride and carbide to have a thickness of 75 nm and that the dielectric layer 14 is made of silicon hydride and carbide to have a thickness of 150 nm.

The recording medium was tested in the manner described above. It is confirmed that the recording medium has an excellent recording sensitivity and an excellent signal quality. After the recording medium was preserved in an environment of a temperature of 80° C. and a relative humidity of 90% for 500 hours, it was observed that problems do not occur in the recording and the reading operation.

Figure 5:
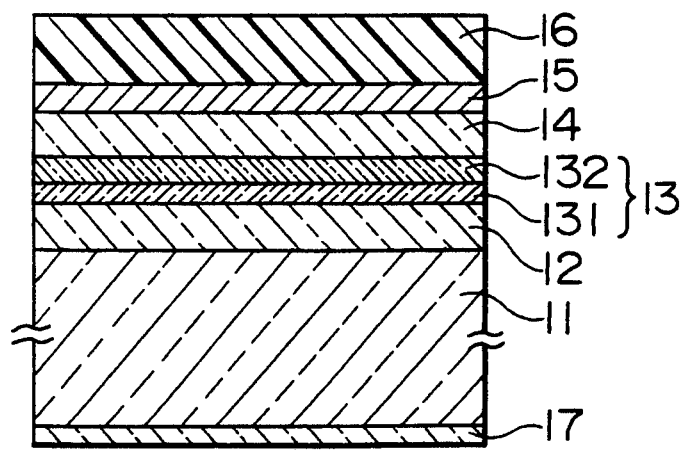
FIG. 5 is a vertical sectional view of a modification of the optical recording medium illustrated in FIG. 4.

Turning to FIG. 5, the description will be directed to a modification of the optical information recording medium illustrated in FIG. 4. The modification comprises similar parts designated by like reference numerals. In the modification, the covering layer 17 covers the substrate 11 in the manner which is described with reference to FIG. 3. The covering layer 17 is made of $SiO_2$.

Figure 6:
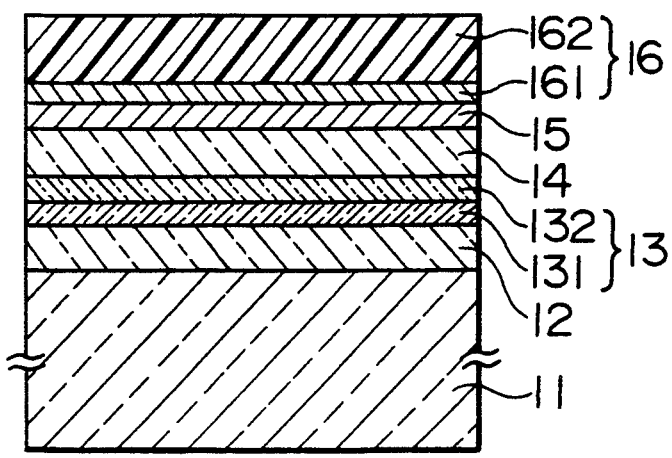
FIG. 6 is a vertical sectional view of an optical recording medium according to a third embodiment of this invention.

Turning to FIG. 6, the description will be directed to an optical information recording medium according to a third embodiment of this invention. The recording medium comprises similar parts designated by like reference numerals. In the recording medium, the protective layer 16 comprises a first protective layer 161 on the metal layer 15 and a second protective layer 162 covering the first protective layer 161. The first protective layer 161 is made of an Ni-Cr alloy alone. The second protective layer 162 is made of an organic material, such as ultraviolet curable resin.

The description will now proceed to a method of manufacturing the recording medium of FIG. 6 by the use of a sputtering device (not shown).

At first, a circular plate is placed in the sputtering device. The circular plate is made of polycarbonate to have a diameter of 86 mm and a thickness of 1.20 mm. After the sputtering device is evacuated into vacuum below $5 \times 10^{-7}$ Torr, the circular plate is subjected to sputter etching to have a surface part removed to an approximate depth of 2 nm. This results in manufacturing the substrate 11.

A silicon target is subjected to sputtering in a gas mixture of argon and nitrogen to deposit, on the substrate 11, the interference layer 12 to a thickness of 80 nm. A GdFeCo target (Gd:Fe:Co=20.5:65.0:14.5 at %) is subjected to sputtering in an argon gas to deposit, on the interference layer 12, the first magneto-optical layer 131 to a thickness of 16.5 nm. A TbFeTi target (Tb:Fe:Ti=18.6:79.4:2.0 at %) is subjected to sputtering in the argon gas to deposit, on the first magneto-optical layer 131, the second magneto-optical layer 132 to a thickness of 69 nm. A silicon target is subjected to sputtering in the gas mixture to deposit, on the second magneto-optical layer 132, the dielectric layer 14 to a thickness of 160 nm. An Al-Ti alloy target (containing 1.0% by weight of Ti) is subjected to sputtering in the argon gas to deposit, on the dielectric layer 14, the metal layer 15 to a thickness of 105 nm. An Ni-Cr alloy target (containing 80% by weight of Ni) is subjected to sputtering in the argon gas to deposit, on the metal layer 15, the first protective layer 161 to a thickness of 30 nm. In this manner, the optical information recording medium of FIG. 6 is partly manufactured to a half-completed medium.

After the metal layer 15 is formed, the half-completed medium is brought out from the sputtering device into an atmospheric air. The metal layer 15 is subjected to spin-coating with ultraviolet curable resin in the manner known in the art. As a result, the metal layer 15 is covered by the ultraviolet curable resin. To the ultraviolet curable resin covering the metal layer 15, ultraviolet rays are irradiated to form the protective layer 16 having an ultimate thickness of 10 microns.

The description will proceed to a test of characteristics of the recording medium of FIG. 6.

The recording medium is rotated at 3600 rpm. In this condition, the recording medium is subjected to the particular magnetic field with a laser beam of a laser diode irradiated onto the first magneto-optical layer 131 through the substrate 11 and the interference layer 12 and focused to have a reduced diameter which is substantially equal to 1.3 microns. Herein, the laser beam has a wavelength of 780 nm. For a signal having a recording frequency of 1.0 MHz, writing operation is carried out at a radial distance of 30 mm with a duty ratio of 50%, a recording bias magnetic field of ±250 oersted, and a recording power of 4.5 mW. Under the circumstances, the C/N ratio is equal to 47 dB. It is thus confirmed that the recording medium has an excellent recording sensitivity and an excellent signal quality.

After the recording medium was preserved in an environment of a temperature of 80° C. and a relative humidity of 90% for 500 hours, it had been observed that problems do not occur in the recording and reading operation. Therefore, the recording medium is sufficient for practical use.

Figure 7:
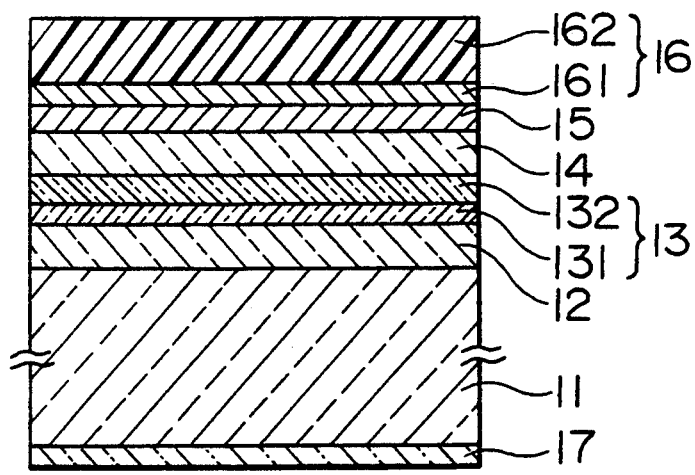
FIG. 7 is a vertical sectional view of a modification of the optical recording medium illustrated in FIG. 6.

Turning to FIG. 7, the description will be directed to a modification of the optical information recording medium illustrated in FIG. 6. The modification comprises similar parts designated by like reference numerals. In the modification, the covering layer 17 covers the substrate 11 in the manner which is described with reference to FIG. 3. The covering layer 17 is made of $SiO_2$.

The description will now proceed to a method of manufacturing the recording medium of FIG. 7 by the use of a sputtering device (not shown).

At first, a circular plate is placed in the sputtering device. The circular plate is made or polycarbonate to have a diameter of 86 mm and a thickness of 1.20 mm. The circular plate has a first plate surface and a second plate surface opposite to the first plate surface. The guiding grooves are made on the first plate surface. The second plate surface is subjected to first sputter etching to have a surface part removed to an approximate depth of 2 nm. After the first sputter etching is carried out, a silicon target is subjected to sputtering in a gas mixture of argon and nitrogen to deposit, on the second plate surface, the covering layer 17 to a thickness of 50 nm. Next, the first plate surface is subjected to second sputter etching to have a surface part removed to an approximate depth of 2 nm. This results in manufacturing a combination of the substrate 11 and the covering layer 17.

A silicon target is subjected to sputtering in the gas mixture to deposit, on the substrate 11, the interference layer 12 to a thickness of 80 nm. A GdFeCo target (Gd:Fe:Co=20.5:65.0:14.5 at %) is subjected to sputtering in an argon gas to deposit, on the interference layer 12, the first magneto-optical layer 131 to a thickness of 16.5 nm. A TbFeTi target (Tb:Fe:Ti=18.6:79.4:2.0 at %) is subjected to sputtering in the argon gas to deposit, on the first magneto-optical layer 131, the second magneto-optical layer 132 to a thickness of 69 nm. A silicon target is subjected to sputtering in a second gas mixture of argon and nitrogen to deposit, on the second magneto-optical layer 132, the dielectric layer 14 to a thickness of 160 nm. An Al-Ti alloy target (containing 1.0% by weight of Ti) is subjected to sputtering in the argon gas to deposit, on the dielectric layer 14, the metal layer 15 to a thickness of 105 nm. An Ni-Cr alloy target (containing 80% by weight of Ni) is subjected to sputtering in the argon gas to deposit, on the metal layer 15, the first protective layer 161 to a thickness of 30 nm. In this manner, the optical information recording medium of FIG. 7 is partly manufactured to a half-completed medium.

After the metal layer 15 is formed, the half-completed medium is brought out from the sputtering device into an atmospheric air. The metal layer 15 is subjected to spin-coating with ultraviolet curable resin in the manner known in the art. As a result, the metal layer 15 is covered by the ultraviolet curable resin. To the ultraviolet curable resin covering the metal layer 15, ultraviolet rays are irradiated to form the protective layer 16 having an ultimate thickness of 10 microns.

The description will proceed to a test of characteristics of the recording medium of FIG. 7.

The recording medium is rotated at 3600 rpm. In this condition, the recording medium is subjected to the particular magnetic field with a laser beam of a laser diode irradiated onto the first magneto-optical layer 131 through the substrate 11 and the interference layer 12 and focused to have a reduced diameter which is substantially equal to 1.3 microns. Herein, the laser beam has a wavelength of 780 nm. For a signal having a recording frequency of 1.0 MHz, writing operation is carried out at a radial distance of 30 mm with a duty ratio of 50%, a recording bias magnetic field of ±250 oersted, and a recording power of 4.5 mW. Under the circumstances, the C/N ratio is equal to 47 dB. It is thus confirmed that the recording medium has an excellent recording sensitivity and an excellent signal quality.

After the recording medium had been preserved in an environment of a temperature of 80° C. and a relative humidity of 90% for 500 hours, it was observed that problems do not occur in the recording and reading operation. Therefore, the recording medium is sufficient for practical use.

While the present invention has thus far been described in connection with only a few embodiments thereof, it will readily be possible for those skilled in the art to put this invention into practice in various other manners. For example, the covering layer 17 may be produced after deposition of the protective layer 16 although the description is made as regards a case where the covering layer 17 is first produced.

What is claimed is:

1. An optical information recording medium used for recording information by irradiation of a laser beam with a magnetic field, said recording medium comprising:
    a substrate transparent to the laser beam;
    a first magneto-optical layer of GdFeCo; and
    a second magneto-optical layer of TbFeTi, said first magneto-optical layer being disposed between said substrate and said second magneto-optical layer.

2. An optical information recording medium as claimed in claim 1, further comprising an interference layer disposed between said substrate and said first magneto-optical layer, said interference layer being transparent to the laser beam.

3. An optical information recording medium as claimed in claim 2, wherein said interference layer is made of silicon nitride.

4. An optical information recording medium as claimed in claim 1, further comprising a covering layer of silicon dioxide, said substrate being disposed between said first magneto-optical layer and said covering layer.

5. An optical information recording medium as claimed in claim 1, further comprising a dielectric layer disposed on said second magneto-optical layer.

6. An optical information recording medium as claimed in claim 5, wherein said dielectric layer is made of silicon nitride.

7. An optical information recording medium as claimed in claim 5, further comprising a metal layer disposed on said dielectric layer.

8. An optical information recording medium as claimed in claim 7, further comprising a protective layer disposed on said metal layer.

9. An optical information recording medium as claimed in claim 8, wherein said protective layer is made of an organic material.

10. An optical information recording medium as claimed in claim 8, wherein said protective layer comprises:
    a first protective layer of an Ni-Cr alloy disposed on said metal layer; and
    a second protective layer of an organic material disposed on said first protective layer.

* * * * *